United States Patent [19]

Herrington

[11] 4,081,231
[45] Mar. 28, 1978

[54] FLOW DISTRIBUTION VALVE FOR DUAL THERMOPLASTIC TUBE EXTRUSION

[75] Inventor: F. John Herrington, Holcomb, N.Y.

[73] Assignee: Mobil Oil Corporation, New York, N.Y.

[21] Appl. No.: 753,747

[22] Filed: Dec. 23, 1976

[51] Int. Cl.² .............................................. B29F 3/06
[52] U.S. Cl. .................................. 425/464; 137/872; 137/625.48; 251/319; 425/382 R
[58] Field of Search ................... 137/610, 625.48; 251/319, 282; 425/382, 464, 382.2, 463, 192, 190; 156/244

[56] References Cited
U.S. PATENT DOCUMENTS

| 3,355,763 | 12/1967 | Willert | 425/382 X |
| 3,468,340 | 9/1969 | DiCamillo | 137/625.48 |
| 3,901,636 | 8/1975 | Zink et al. | 156/244 X |

Primary Examiner—J. Howard Flint, Jr.
Assistant Examiner—Mark Rosenbaum
Attorney, Agent, or Firm—Charles A. Huggett; James D. Tierney

[57] ABSTRACT

In a thermoplastic extrusion system where a single extruder feeds molten polymer through a manifold to a plurality of separate extrusion orifices, a valve is provided which distributes and regulates the flow of the molten polymer to the individual extrusion orifices.

1 Claim, 6 Drawing Figures

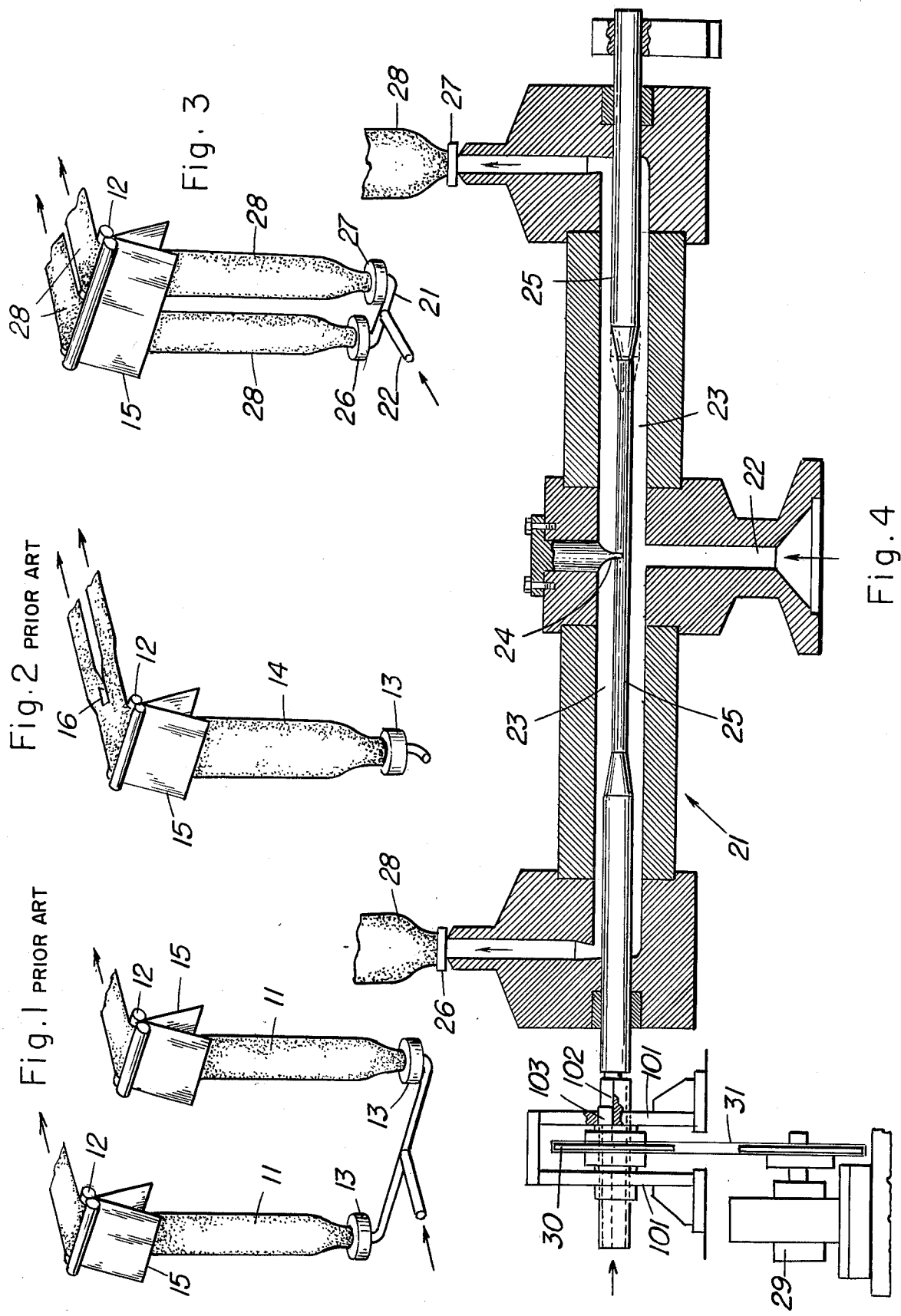

FLOW DISTRIBUTION VALVE FOR DUAL THERMOPLASTIC TUBE EXTRUSION

BACKGROUND OF THE INVENTION

1. Field of the Invention

In thermoplastic extrusion operations requiring the feed of molten polymer from a single extruder to a pair of extrusion outlet orifices or dies, care must be taken to insure that the distribution and pressure of the molten polymer exiting from each die is easily regulatable within precise limits to insure product quality and uniformity of the individual extruded films.

2. Description of the Prior Art

In the past, it has been common practice to feed tubular extrusion dies with a single extruder (not shown) as illustrated in FIG. 1. When it is desired to adjust the average film thickness 11 of the respective tubes, this may be accomplished by varying the rotational speed of the positively driven take-up nip rollers 12. An increase in nip-roller speed draws the still and semi-molten polymer immediately adjacent the extrusion orifice away from the die 13 at a higher rate, resulting in a gauge reduction of the final tubular product. Such an arrangement for gauge control adjustment can be employed only when the tubes are being fed to separate, in-line, bag making machines due to the differential in the rate of travel between the flattened tubes.

FIG. 2 shows an alternate prior art technique of forming two tubes from a single extruder (not shown) by extruding a relatively large tube 14, passing the extruded tube through collapsing shields 15, nip rollers 12, and subsequently slit-sealing the tube utilizing a heated wire or blade 16. The forming technique has the advantage of permitting two tubular streams to be fed through one set of wide downstream equipment, such as printing presses and bag-making machines, but it has the drawback of introducing an additional heat seal seam in the finished bag product making such bags more susceptible to rupture under load stresses applied during use of the bag.

It would be possible to attain the quality advantage of the dual tube technique (FIG. 1) in which there is no side seal, along with the economic advantage of the slit-seal technique (FIG. 2) in which there is only a single set of downstream machinery, by extruding two tubes and running them through the same set of nip rolls. However, this does not permit operating the two tubes at different take-off speeds in order to adjust their relative average gauge. Such adjustment would require the employment of a separate flow-control valve for each die.

A typical flow control valve that is commonly used in prior art is shown in FIG. 3(a). Molten thermoplastic material 203 is caused to flow through gap 201, where it is subjected to a pressure drop. As the valve is adjusted by moving restricter 202, gap 201 is changed, and the resulting pressure drop is changed accordingly. If there are two such valves in parallel fed from a common manifold source and discharging into identical downstream pressures, the flow rate through the two valves is proportional to approximately the 5th power of the size of the gap. Since this gap is usually a small fraction of an inch, it may be seen that a very small change in the size of this gap will result in an undesirably large change in flow rate. For example, if the gap is 0.1 inch, and it is changed by a very small amount such as 0.005 inches, there will be a resulting change in flow through that gap of approximately 28 percent, provided the supply and discharge pressures remain unchanged. Precise flow rate control with such valves is, at best, extremely difficult. It may be seen that prior art valving means such as that described above, when used in a pair (one for each die) cannot readily be used for the purpose of accurately balancing the flow, because they have the following limitations:

(a) They are not sufficiently precise to permit very accurate adjustment of flow distribution, for the reasons described above.

(b) Adjustment of one valve results in a change in net back pressure against the extruder, thus causing a change in total flow leaving the extruder. Therefore, any adjustment of a valve would necessitate re-adjustment of the extruder speed in order to restore the desired overall average thickness of the two streams.

(c) Since there is a separate valve for each die, the operator is required to make a descision which valve to adjust. After numerous adjustments, this sometimes results in both valves being almost fully closed, while at another time both may be almost fully open, so there is a difference in operating conditions (back pressure) for the extruder from one time to another.

SUMMARY OF THE INVENTION

The present invention is directed to a manifold valve which balances the flow of molten thermoplastic resin, such as polyethylene, between two dies which are being fed by the same extruder. The valve is located in a flow channel within the common manifold which feeds the two dies molten polymer. The molten polymer, introduced into the central portion of the manifold, is supplied from a single, conventional, rotating screw extruder. In one embodiment the valve comprises an elongated rod, or spool, which has a cross section (diameter) which is greater at the opposite ends of the rod than at its central portion. The rod, which is substantially symetrical, has a diameter at its center which, at a point spaced laterally from the center, gradually tapers to an increased diameter section, the increased diameter section remaining constant in cross section to the end of the rod. In another alternate embodiment of the valve structure of the present invention, the rod is constructed so that its central portion has a greater cross sectional area than the opposite end portions of the rod. Means are provided to impart lateral displacement to the rod, such as a captive nut which rotates on threads at one end of the rod. Alternatively, a fixed nut and rotatable rod may be employed. Lateral displacement of the valve rod in turn causes lateral displacement of its section or sections of increased diameter. Such displacement causes an increase in pressure drop (thus a decrease in flow) on the molten polymer flowing out one end of the manifold, while simultaneously causing a decrease in pressure drop (thus an increase in flow) on the molten polymer flowing out the opposite end of the manifold. The resulting increase in flow at one end is equal to the decrease in flow at the opposite end, so that the total back pressure against the extruder remains unchanged. The total flow rate leaving the extruder is unchanged, since that flow rate is dependent on the back pressure against the extruder. Obviously the internal diameter of the manifold flow channel must be greater than the diameter of the enlarged ends of the rod to insure a continuous flow path of the molten polymer and permit displacement of the rod within the flow channel. Lateral rod movement may be accomplished manually or by use of a gear motor attached to a chain drive wheel which may be mounted on the captive nut.

In summary, the distribution valve apparatus of the present invention is employed for controlling the flow of molten thermoplastic polymer streams such as polyethylene in extrusion operations where it is desired to extrude at least two tubular films from a single molten resin supply source. Each of the molten polymer streams is fed to separate extrusion die orifices through a manifold which is fed molten polymer from the extruder. The manifold has a substantailly centrally located inlet for introduction of the molten polymer, and comprises a flow channel which contains a flow restriction means, namely the valve rod hereinabove described. The valve rod is laterally displaceable in the manifold flow channel. Lateral displacement of the valve results in an increase in pressure drop at one end of the manifold and an equal decrease in pressure drop at the opposite end of the manifold channel.

BRIEF DESCRIPTION OF THE DRAWINGS

FIGS. 1, 2, and 3a are schematic illustrations of prior art tubular extrusion techniques.

FIG. 3 is a schematic illustration of a portion of an extrusion system which may be employed to form thermoplastic tubes utilizing the apparatus of the present invention.

FIG. 4 is a schematic illustration, in cross section, of the flow distribution valve apparatus of the present invention, mounted coaxially, and aligned within, the manifold flow channel.

DESCRIPTION OF SPECIFIC EMBODIMENTS

Figure 3A:
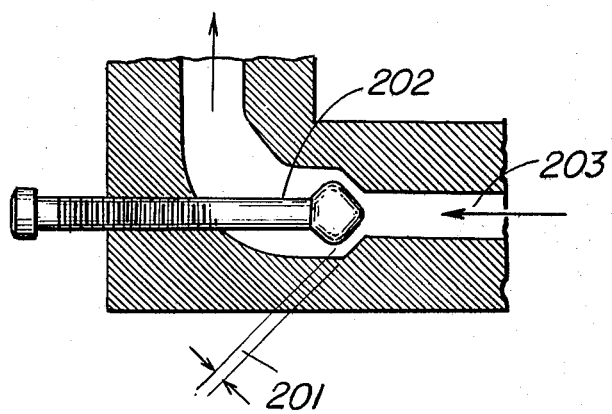

As shown in FIG. 4, molten thermoplastic resin is supplied to manifold 21 by a rotating screw type thermoplastic extruder (not shown). The molten thermoplastic resin is passed through manifold supply channel 22 under pressure from the extruder. Manifold supply channel 22 directs the thermoplastic to flow channel 23 where flow diverter 24 divides the entering stream to opposite ends of flow channel 23. Flow diverter 24 also acts as a support for flow distribution valve 25 to resist the pressure of the incoming polymer without distorting valve 25. It will be noted that flow distribution valve 25 comprises an elongated member which, in the FIG. 4 embodiment, has a central portion of reduced diameter, while the opposite ends of valve 25 flare out to present cross sections having an increased diameter. The molten thermoplastic material passes through the annulus formed by the positioning of valve 25 in flow channel 23 and through tubular extrusion dies 26 and 27 mounted at opposite ends of manifold 21. The molten thermoplastic material is eventually expressed in the form of tubular film 28 through the annular extrusion orifices (not shown) of conventional tubular extrusion dies 26 and 27. It will be noted from FIG. 4 that one end of the distribution valve rod 25 extends through the end of the manifold, and is threaded. The threads on the spool are engaged by threads in a nut which is restrained from lateral movement by brackets 101. A keyway 102 in the threaded section of the spool, engaged by a key 103 fixed to bracket 101, prevents rotation of the spool while the nut may be rotated by driving motor 29 with drive chain 31 so that lateral motion may be imparted to valve rod 25 as required.

The pressure drop of the molten polymer within the manifold supply channel 22 will be dependent upon the size and length of the annulus through which it travels before being expressed into the extrusion dies 26 and 27 on opposite sides of the valve 25. The pressure drop per inch of molten polymer travel is greater in the region surrounding the larger diameter portion of the rod 25. Accordingly, it will be seen that if flow distribution valve rod 25 is shifted to the left, i.e., in the direction of tubular extrusion die 26, the length of that larger diameter portion to which the flowing thermoplastic material is exposed is reduced on the left end, and simultaneously increased on the right end, causing a reduction in pressure drop on the left end and a simultaneous increase in pressure drop on the right end. The flow rate through the left end then increases until the pressure drop is the same as it was before rod 25 was moved, and likewise the flow rate through the right end decreases until the original pressure drop is attained. After that has happened, the pressure in manifold supply channel 22 is the same as it had been previously, and the increase in flow rate at the left end has been equaled by the decrease in flow rate at the right end.

The above-described system has a particular advantage in ease of operation. Prior to adjusting the valve, the speed of the extruder and take-off equipment can be established such that the average product thickness through the two dies 26 and 27 is at the desired level. Then when the valve adjustment is made to produce an equal thickness from both dies, the average does not change. This is because the back pressure in channel 22 is not changed, therefore the pressure against which the extruder must pump its output is not changed, and accordingly the output rate from the extruder is not changed.

The above-described system has a further advantage in precision of adjustment. If there are two such valves in parallel fed from a common manifold source, and discharging into identical downstream pressures, the flow rate through the two valves is proportional to approximately the cube (3rd power) of the length of the annulus. Since the initial length of that annular gap is in the order of several inches, it is possible to make a substantial change in the length to achieve a fine adjustment in flow rate. For example, if the initial length of the annulus is 8 inches, and it is changed by a substantial amount, such as 0.25 inches, there will be a resulting change in flow through that gap of approximately 10 percent, provided the supply and discharge pressures remain unchanged. This permits much more precise adjustment than the variable-gap prior art valve in which a movement of 0.005 inch resulted in a 28 percent change in flow rate.

The above-described system has a further advantage in that there is a single control which may be used by the operator to re-distribute the flow. No decision is required on his part which knob to turn. Moving the spool to the left increases the average thickness of the product on the left and decreases the thickness on the right, and conversely.

Figure 5:
FIG. 5 is a fragmentary view, in cross section, of an alternate form of flow distribution valve in accordance with the present invention.

The valve embodiment shown in FIG. 5 has a centrally located enlarged cross section 301 while its end portions 302 are of reduced cross section. It will be apparent that lateral displacement of this rod causes a displacement of the enlarged portion 301 either right or left. Such displacement causes a variation in the length of the annulus surrounding the enlarged cross section and results in a pressure drop variance as hereinabove described.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. An apparatus for controlling the flow of molten polymer streams, comprising at least two die outlet orifices to which each of said molten polymer streams are fed from a common source and at least two inlet orifices, having constant cross-sectional areas, in communication with said die orifices, said common source comprising a flow channel having a substantially centrally located inlet opening, said flow channel containing a flow restriction means, said restriction means comprising a rod which is laterally displaceable in said channel, the ends of said rod extending through said inlet orifices, said rod being further characterized by having at least one portion of its cross-section enlarged in diameter whereby lateral displacement of said rod controls the flow of molten polymer through said inlet orifices to said die orifices.

* * * * *